July 26, 1932.   C. GUERITEY   1,868,897
CAN HEADING MACHINE
Filed Jan. 2, 1931

INVENTOR
Charles Gueritey,
By Attorneys,
Fraser, Myers & Manley

Patented July 26, 1932

1,868,897

UNITED STATES PATENT OFFICE

CHARLES GUERITEY, OF PASSAIC, NEW JERSEY, ASSIGNOR TO E. W. BLISS COMPANY, OF BROOKLYN, NEW YORK, A CORPORATION OF DELAWARE

CAN HEADING MACHINE

Application filed January 2, 1931. Serial No. 506,093.

This invention relates to machines for applying heads to can bodies by the usual seaming or double-seaming operation. The machine is applicable for bottoming can bodies or for topping filled cans.

My Patent No. 1,666,239, granted April 17, 1928, illustrates and describes in detail a machine designed especially for heading cans of non-circular contour, and while the can is stationary, the seaming rolls revolve around the stationary mandrel which holds the can, and are themselves turned with reference to the can so as to keep their proper seaming relation to the non-circular contour of the can. Such seamers move radially between their seaming and idle positions. The present invention is applicable to the machine set forth in said patent although also useful in connection with other machines for heading can bodies, either circular or non-circular in contour, and while the can body or can is either stationary or revolving.

In machines for heading cans while stationary (such as that set forth in my said patent) the seaming rolls (preferably primary and secondary seamers) are caused to revolve around the stationary mandrel which holds the top of the can body or can; and in the case of a non-circular can, the seaming rolls are contoured reciprocally to the contour of the can and are rotated on their axes in timed relation to their rotation around the can and mandrel, so that their seaming surfaces, when advanced into active position, maintain a uniform relation with the varying contour of the can. To maintain this relation, it is necessary to gear the seamer spindles to the mandrel support according to whatever gear ratio (say 1 to 1 or 2 to 3) is determined upon in any given case. For a stationary can body, this is accomplished by a sun gear fixed to the mandrel support and planet gears in continual mesh with the sun gear as they revolve around it and connected to the seamers to rotate the latter in proper timed relation both in their inactive and their active positions. In the machine of my said patent such planet gears are caused to rotate in circular orbits, their axes having an invariable distance from the axis of the sun gear; and the seamers, whose axes move out and in during the seaming cycle so that their orbits describe two different circles, are driven from the planet gears through clutches. In addition, in such machines, it is desirable to have the seamers in positively geared relation with the mandrel support while the seamers are approached for performing their seaming operation, at which time they operate under pressure and the rotary drag upon them tends to make them turn or lag out of step; and to accomplish this according to my said machine, the seamers have fixedly mounted on them seamer gears which come into mesh with a sun gear (or an extension of the sun gear with which the planetary gears mesh), being caused to enter into mesh therewith as they approach by being revolved in time therewith by the planet gears through such clutches. That construction involves, in addition to the sun gear or gears, a planet gear and seamer gear and an intervening clutch for each seamer.

The present invention provides a simpler construction whereby each seamer is provided with only a single gear which maintains constant engagement with the sun gear. This single gear thus takes the place of the planet gear and the seamer gear and the interposed clutch of the former construction. This simplification is rendered possible by the discovery that it is practicable to use gears having such prolonged teeth that they continue in driving mesh during the time that the seamers are retracted to their inactive positions. The teeth are thus made longer than the radial inward and outward movement of the seamers. Thus the seamers are kept in step with the mandrel holding the can at all times, and when advanced to roll the seam the teeth are brought into complete mesh whereby the seamers are driven with the necessary positiveness.

The accompanying drawing shows the present invention as applied to the machine of my said patent. The greater part of the machine requires no illustration, because fully illustrated in my said patent.

Figure 1:
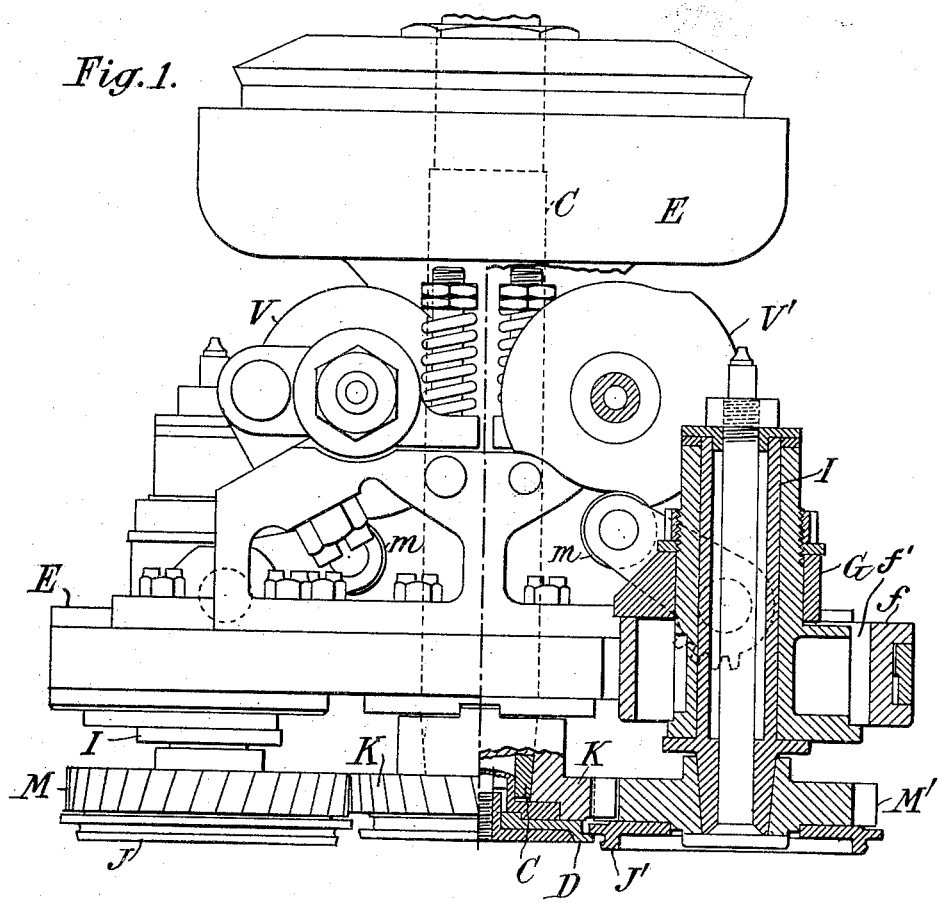
Fig. 1 is a side elevation partly in vertical section, corresponding generally to the lower part of Fig. 1 of my said patent, and in part to the right of Fig. 6 thereof.

The parts shown in the drawing, in so far as they are essentially identical with corresponding parts shown in the figures referred to in my said patent, are marked with the same reference letters. These parts will require no description in the present specification, reference being made to my said patent for an understanding of the general character and operation of the machine and of such details of construction as are here shown.

For the present purpose, it is sufficient to say that E is a seamer head which in the present instance is revolving, being driven by bevel gears as in said patent, and turning about a central spindle (lettered C in said patent) which is held fast in the main frame or head of the machine. The mandrel D, which enters the top of the can body for seaming, is mounted fixedly at the bottom of said spindle. The seamers J, J' are mounted on upright spindles I, I carried in slides G, G, movable radially in slideways $f'$ formed in the lower disk-shaped part $f$ of the seamer head E; and these slides are moved toward and from the central axis by the action of slowly revolving cams V, V' through floating levers $m, m$, as in said patent, whereby to move the seamers J and J' into and out of seaming relation with the mandrel D, all as is well understood in machines of this type.

On the fixed central spindle or mandrel support C is fixedly mounted a stationary gear K, which takes the place of the sun gear of said patent, and which I will call the master gear. Meshing with this are gears M, M', which I will call the seamer gears and which are fast upon the seamer spindles I, I and have a fixed relation to the seamers J, J'.

The seamers J, J' are of the same contour as shown in Fig. 5 of my said patent. This results from the facts (1) that the machine is designed for seaming an oblong can having rounded corners, the contour of which is shown in dotted lines in Fig. 2, being the contour of the mandrel D; and (2) the gear ratio here adopted is 2 to 3, so that the seamers J, J' have three major projections corresponding to the flat sides of the can, with three intermediate minor projections corresponding to the flat ends of the can, with a different shaped can or with a different gearing ratio, the contours of the seamers would be correspondingly changed.

Figure 2:
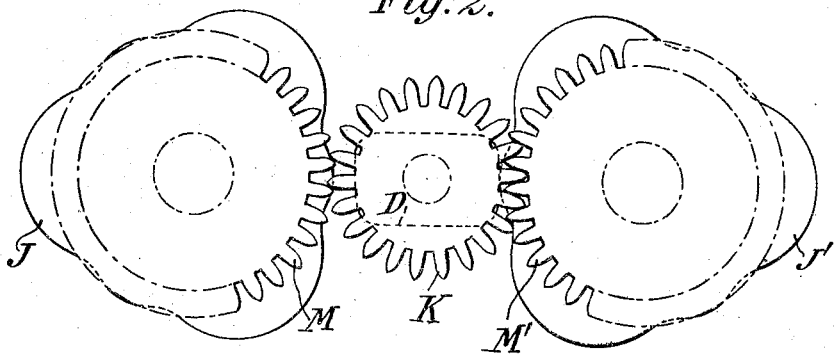
Fig. 2 is a plan somewhat diagrammatic in character and corresponding generally to Fig. 5 of my said patent.

The gears K, M, M' are formed with extremely deep teeth, as clearly shown in Fig. 2. The seamer J' in Fig. 2 is shown in its position of approach to the mandrel, being its active or seaming position, and in this position the teeth of the gears K, M' are fully in mesh, as shown at the right in Fig. 2, thus imparting a positive drive to the seamer during the time when it is doing its work. The seamer J is shown retracted from the mandrel, being the position it occupies when the can body is being applied to and removed from the mandrel before and after seaming, and when the seamer is retracted while the other seamer is at work. In this retracted position the teeth of the gears K, M are separated to the extent shown at the left in Fig. 2 but are in sufficient mesh so that the rotary drive of the seamer is maintained and it is kept from getting out of step with the mandrel; so that when next advanced it will enter into correct angular relation with the mandrel, and its seaming faces of varying contour will be so related to the varying contours of the mandrel and can body as to correctly perform the seaming operation. Thus the teeth of the gears are of a depth exceeding the radial movement of the seamers between their seaming and idle positions.

It will be observed that the gears M, M' here shown replace not only the gears M, M' of my said patent but also the gears L, L thereof, and that the clutches N, N of said patent, including their reciprocal members, are wholly omitted. The present invention accordingly accomplishes an important simplification of the machine. This simplification is attained without any diminution in speed or in accuracy of operation or in the strength of the operative parts.

While describing the reference to a revolving seamer head for seaming cans while stationary, yet it is to be understood that the present invention is not limited to that type of machine. It is well understood in this art that the seaming mechanism is essentially the same, whether the can and mandrel be stationary and the seamers revolve in planetary manner; or whether the seamer head be stationary and the can and mandrel revolve.

So far as the mechanism is illustrated in the accompanying drawing, its construction would be the same in either instance. For this reason I have avoided referring to the gear K as a stationary or sun gear and have not designated the gears M, M' as planetary gears. If the can revolves the seamer head E is held stationary, and accordingly the seamers and their gears turn upon stationary axes.

The present invention does not exclude use in a seamer for circular cans, but for such purpose it is ordinarily not necessary to maintain a geared relation between the seamers and the mandrel. For machines which are to be used with different shaped mandrels for seaming either circular or non-circular cans, such geared relation is necessary for the latter and may conveniently be retained at all times.

The invention is susceptible of those modifications which are within the knowledge of persons skilled in this art.

It is preferable to make the gears K, M, M' as skew gears, as shown in Fig. 1, as this gives a more constant mesh during the period of partial separation and affords smoother running; this feature is not shown in Fig. 2, since this figure is diagrammatic and the parallel type of gears are selected for greater clearness.

I claim as my invention:

1. A can heading machine of the described type, having a non-circular mandrel and seamers of contours complementary thereto, the seamers having a given radial movement toward and from the mandrel, and gearing for maintaining definite angular relations between the seamers and mandrel, characterized in that such gearing comprises a master gear having fixed relation to the mandrel and seamer gears fixed to the seamers, said gears having teeth of a depth greater than such radial movement, so as to remain in mesh during the movements of the seamers toward and from the mandrel.

2. A can heading machine according to claim 1, comprising a stationary mandrel and revolving head carrying the seamers, the master gear fixed to the stationary mandrel and the seamer gears having planetary engagement with the master gear.

3. A can heading machine of the described type, having a mandrel and seamer, the latter movable radially toward and from the mandrel, and mutually engaging gears fixed to the mandrel and seamer respectively, the teeth of which are of a depth greater than the radial movement of the seamer between its active and inactive positions, whereby the gears remain in mesh during such radial movements.

In witness whereof, I have hereunto signed my name.

CHARLES GUERITEY.